United States Patent [19]

Madsen et al.

[11] 4,041,338

[45] Aug. 9, 1977

[54] DIRECT CURRENT DYNAMOELECTRIC MACHINE COMMUTATING POLE ASSEMBLY

[75] Inventors: John E. Madsen, Lemont; Walter Drabik, Downers Grove, both of Ill.

[73] Assignee: General Motors Corporation, Detroit, Mich.

[21] Appl. No.: 633,826

[22] Filed: Nov. 20, 1975

[51] Int. Cl.² ............................................. H02K 1/10
[52] U.S. Cl. ........................................ 310/186; 310/46
[58] Field of Search ........................ 310/239, 186–188, 310/46, 223, 177, 224, 136–142, 258, 225, 259, 226, 269; 318/521, 523, 529, 531

[56] References Cited

U.S. PATENT DOCUMENTS

| | | | |
|---|---|---|---|
| 2,235,075 | 3/1941 | Kimball | 310/186 |
| 2,475,535 | 7/1949 | Weilbaecher | 310/186 |
| 3,201,626 | 8/1965 | Calabrese | 310/186 |
| 3,263,147 | 7/1966 | Robinett | 310/186 |
| 3,335,306 | 8/1967 | Landis | 310/187 |
| 3,441,760 | 4/1969 | Collens | 310/186 |
| 3,648,089 | 3/1972 | De Wolf | 310/186 |

FOREIGN PATENT DOCUMENTS

| | | | |
|---|---|---|---|
| 1,416,678 | 9/1965 | France | 310/186 |

*Primary Examiner*—R. Skudy
*Attorney, Agent, or Firm*—Richard G. Stahr

[57] ABSTRACT

A direct current dynamoelectric machine commutating pole assembly consisting of a commutating pole piece made up of a plurality of stacked laminations of a magnetic material having a first elongated portion and an integral second portion extending substantially normal to the elongated portion and an electrical commutating winding positioned upon the integral second portion.

1 Claim, 3 Drawing Figures

DIRECT CURRENT DYNAMOELECTRIC MACHINE COMMUTATING POLE ASSEMBLY

This invention is directed to a direct current dynamoelectric machine and, more specifically, to a commutating pole assembly therefor.

Direct current dynamoelectric machines consist of the frame member of a magnetically permeable material, a brush support and brushes and a source of magnetic flux, which may be field windings or permanent magnets, mounted therein and an armature assembly rotatably supported within the frame including a plurality of current carrying electric coils and a commutator. To supply electrical power to the armature coils, the armature coils are electrically connected to the several segments of the commutator. The transfer of electrical power from the direct current potential source to the armature windings through sliding engagement of the brushes with the commutator segments is termed "commutation." Each time an armature coil undergoes commutation, the direction of electrical current flow through the armature coil must be reversed. During the reversal of current through an armature coil, a voltage is caused to exist in the coil due to the inductance of the coil. This voltage is responsible for commutator-brush sparking during the commutation function, consequently a complete neutralization of the back EMF would insure essentially sparkless commutation. To reduce the commutator-brush sparking, it is a common expedient to supply direct current dynamoelectric machines with commutating poles or interpoles located between the main field poles which include windings which are traversed by armature coil current. The commutating pole windings are so arranged that the magnetic flux produced thereby induces a voltage in the armature coils under commutation which is of a polarity opposite to that of the voltage of self inductance.

In the prior art, the commutating pole magnetic circuit and the main or field pole magnetic circuit share a common element, the dynamoelectric machine frame. Consequently, changes in main field excitation and resultant changes in frame saturation produce changes in the commutating pole flux at constant interpole coil current thereby disrupting the desired proportionality between commutating pole flux and current. Furthermore, with the prior art arrangement, a second disadvantage is present with direct current motors operating on undulating direct current supply, such as that produced by rectifier bridges, or with motors subjected to rapid transient load current changes. If the commutating flux path includes a non-laminated element such as the frame, the resultant eddy currents in the element produced by changing commutating flux cause the commutating flux to lag the armature current, thereby destroying the aforementioned desired proportionality. One prior art method of overcoming these two disadvantages is to place within the solid frame a laminated commutating pole circuit, which laminations are disposed in planes perpendicular to the armature rotational axis. While this approach largely accomplishes the objective, there are two attendant disadvantages. It makes the frame thicker in a radial direction and it is an approach that cannot readily be used to modify an existing design without extensive changes.

Another prior art method of overcoming the previously described disadvantages is to construct the frame of laminations. This expedient results in a weaker frame which is more difficult and expensive to construct and it allows main pole flux to pass entirely through a laminated path without substantial eddy current damping. Eddy current damping, while undesirable for commutating pole flux, is often desirable for main pole flux since oscillation of main pole flux induces within those armature conductors which are commutating, an undesirable voltage which disrupts the commutating process.

It is, therefore, an object of this invention to provide an improved direct current dynamoelectric machine.

It is another object of this invention to provide an improved direct current dynamoelectric machine having a commutating pole assembly made up of a plurality of stacked laminations of a magnetic material.

In accordance with this invention, a commutating pole assembly for a direct current dynamoelectric machine is provided wherein each commutating pole piece is made up of a plurality of laminations of a magnetic material having an elongated portion extending in a direction axial to the dynamoelectric machine armature, an integral second portion extending substantially normal to the first elongated portion and an electrical commutating winding positioned upon the integral second portion.

For a better understanding of the present invention, together with additional objects, advantages and features thereof, reference is made to the following description and accompanying drawing in which.

Throughout the several FIGS. of the drawing, like elements have been assigned like characters of reference.

Figure 2:
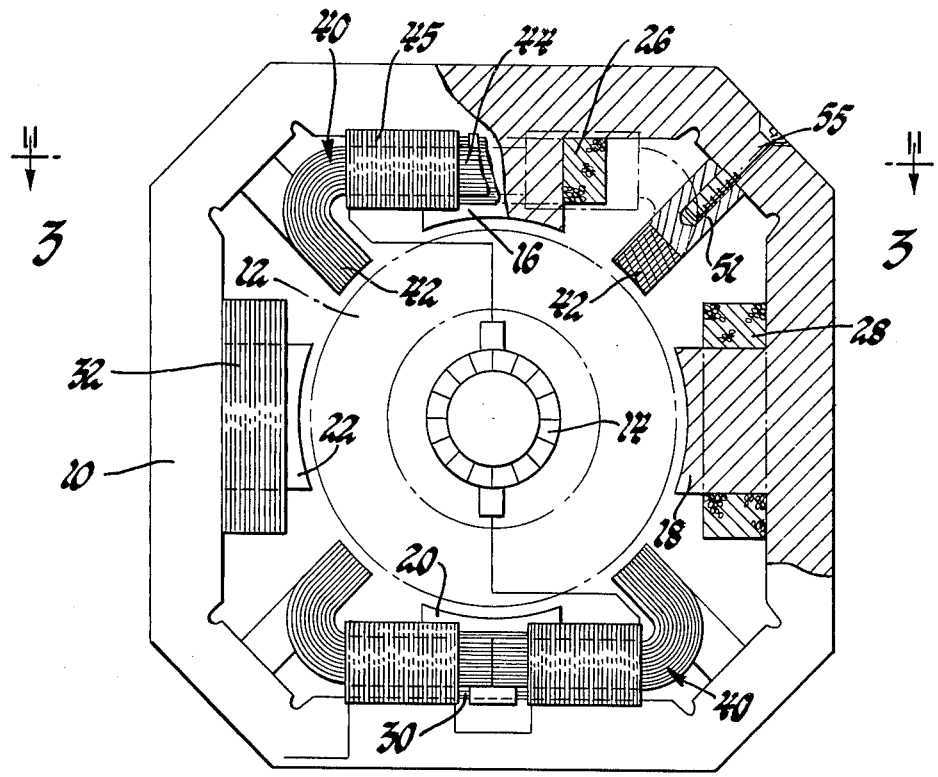
FIG. 2 is an end view, partially in cross-section of a direct current dynamoelectric machine showing the commutating pole assemblies of this invention installed therein.

Referring to the drawing and more particularly to FIG. 2, the direct current dynamoelectric machine includes a frame member 10 of a magnetically permeable material, an armature assembly 12 including a commutator 14 through which electrical power is supplied to the armature windings, not shown, mounted for rotation within the space defined by the interior surface of frame member 10. A plurality of salient field pole assemblies 16, 18, 20 and 22 extend radially inwardly from the interior surface of frame member 10 and terminate adjacent the armature 12. Each of the salient field pole assemblies include respective field windings 26, 28, 30 and 32 which are energized by an external source of direct current potential, not shown, in a manner well known in the dynamoelectric machine art.

Figure 1:
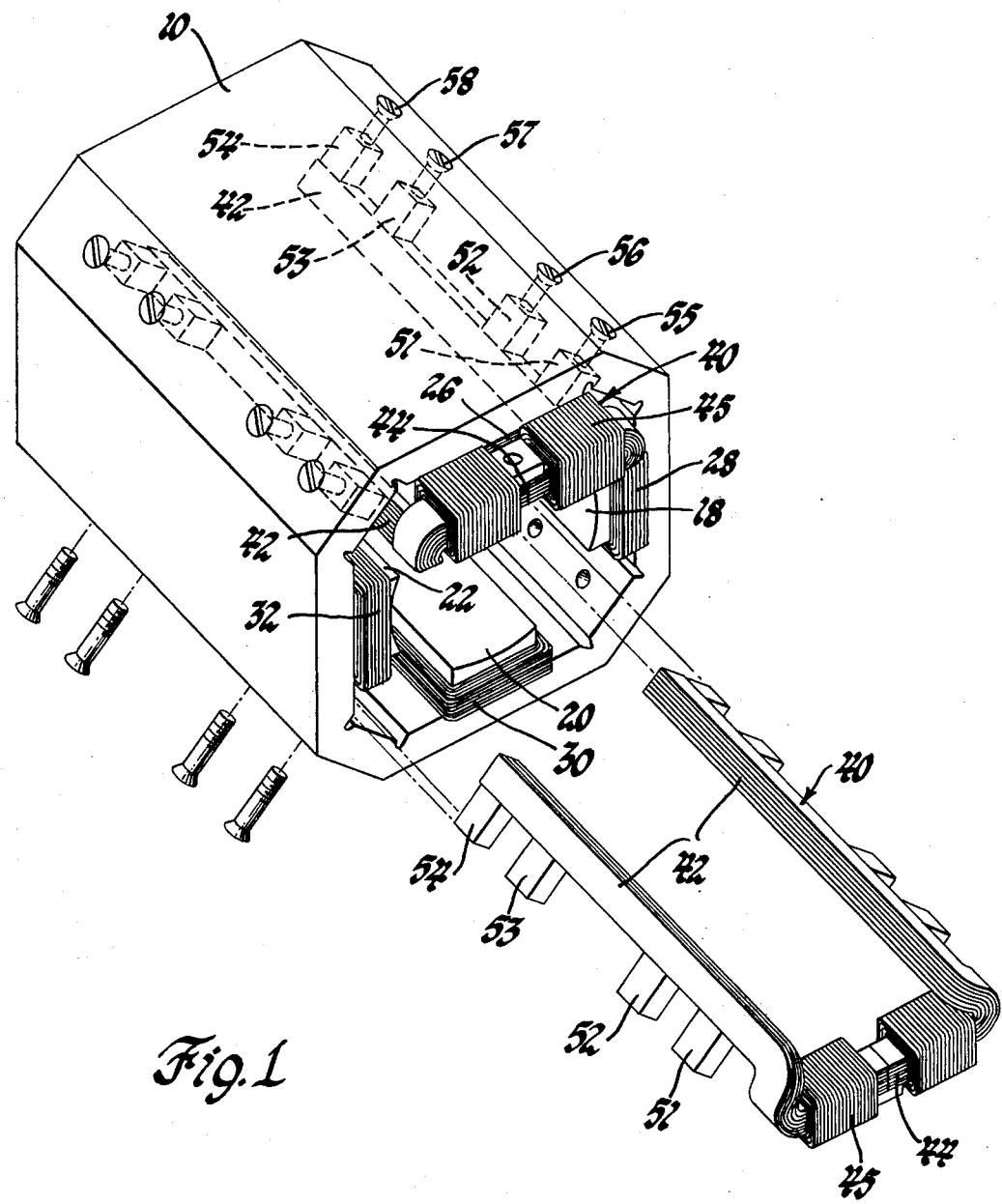
FIG. 1 is a perspective view of a direct current dynamoelectric machine showing one of the commutating pole assemblies of this invention in an exploded relationship.
Figure 3:
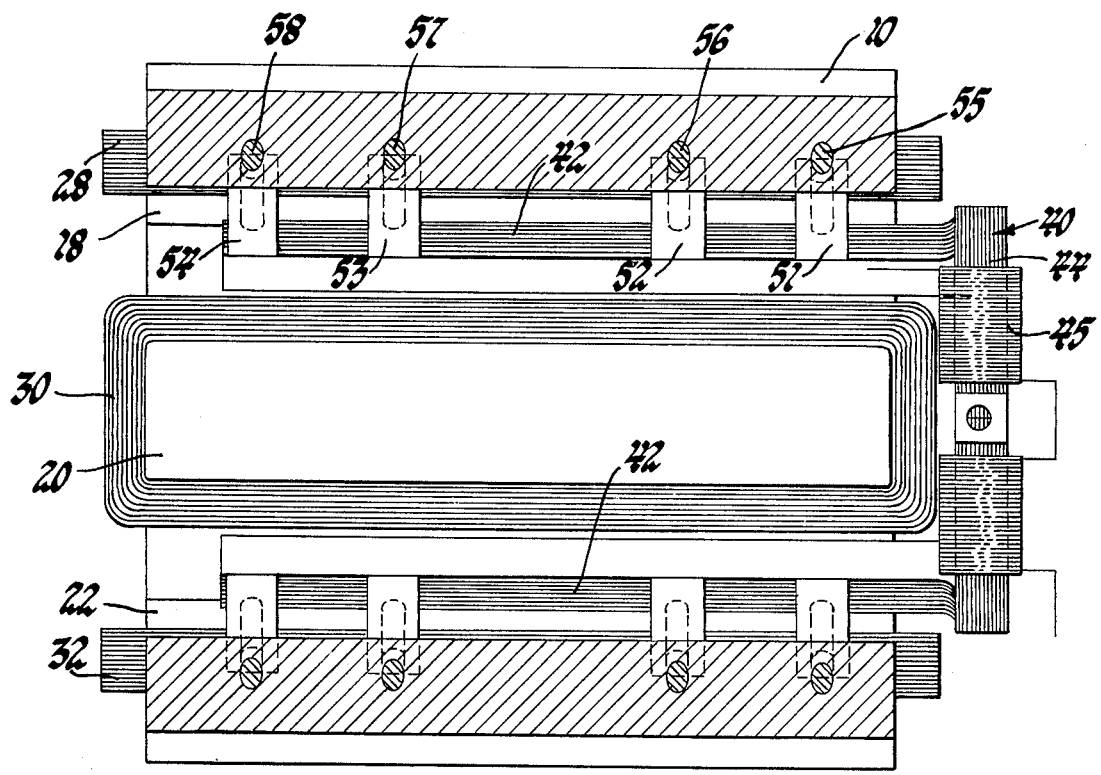
FIG. 3 is a section view of FIG. 2 taken along line 3—3 and looking in the direction of the arrows.

Although the drawing shows a commutating pole assembly between each adjacent field pole pair, as all are identical, only one will be described in detail. Each commutating pole piece 40 of the commutating pole assembly of this invention is made up of a plurality of stamped laminations of a magnetic material having a first elongated portion 42, best illustrated in FIGS. 1 and 3, and an integral second portion 44, also best illustrated in FIGS. 1 and 3, extending substantially normal to the elongated first portion 42. The elongated portion 42 of each commutating pole piece is located in the space between adjacent field pole assemblies, the elongated portion 42 and the plurality of stacked laminations of which it is made up extending in the direction axial to armature 12. To supply the commutating pole flux, an electrical commutating winding 45 is wound upon the integral second portion 44.

To isolate the magnetic circuit of the commutating pole piece assembly from the magnetic circuit of the field poles, each commutating pole piece assembly is positioned in spaced relationship relative to the frame 10 of the dynamoelectric machine by spacer blocks of a non-magnetic material. In the drawing, the spacer blocks associated with the commutating pole piece assembly being described are referenced by the numerals 51, 52, 53 and 54. The spacer blocks may be secured to one of the flat face surfaces of the elongated portion 42 of each commutating pole piece by a suitable adhesive. The end of each of the spacer blocks remote from the elongated portion 42 of the commutating pole piece 40 is drilled and tapped to accommodate mounting screws 55, 56, 57 and 58 which extend through holes provided therefor in frame member 10.

When each of the commutating windings 45 is energized by armature current, the magnetic flux produced thereby passes through the commutating pole piece 40 and the teeth and magnetic core of armature 12.

To manufacture the commutating pole pieces illustrated in the drawing, a plurality of L-shaped pieces of a magnetic material such as magnetic steel may be stacked to the desired height and bent to the shape illustrated in the drawing. The ends may then be trimmed so as to provide a close butt fit at the seam between adjacent commutating pole pieces.

In the alternative, each of the commutating pole pieces may be made up of plurality of laminations of a magnetic material having first and second elongated portions, each located in a respective space between adjacent field pole assemblies and extending in a direction axial to armature 12 with an integral second portion extending substantially normal to the first and second elongated portions. This alternative would eliminate the seam between adjacent elongated portions. Therefore, each of the commutating pole pieces would be of a U-configuration and may be manufactured by stacking a plurality of U-shaped laminations to the desired height and bending them to the desired configuration.

While a preferred embodiment of the present invention has been shown and described, it will be obvious to those skilled in the art that various modifications and substitutions may be made without departing from the spirit of the invention which is to be limited only within the scope of the appended claims.

We claim:

1. In a direct current dynamoelectric machine having an armature assembly including a commutator through which electrical power is supplied to the armature windings mounted for rotation within the space defined by the interior surface of a frame member and a plurality of salient field pole assemblies extending radially inwardly from the interior surface of the frame member and terminating adjacent the armature, a plurality of commutating pole assemblies for improving armature commutation, each of said commutating pole assemblies comprising:

a commutating pole piece supported by said frame member made up of a plurality of laminations of a magnetic material having a first elongated portion located in the space between adjacent said field pole assemblies and extending in a direction axial to said armature and an integral second portion extending substantially normal to said elongated first portion, and an electrical commutating winding positioned upon said integral second portion of said commutating pole piece.

* * * * *